(12) United States Patent
Brender et al.

(10) Patent No.: US 7,739,516 B2
(45) Date of Patent: Jun. 15, 2010

(54) IMPORT ADDRESS TABLE VERIFICATION

(75) Inventors: Scott A. Brender, Kirkland, WA (US); Philip J. Lafornara, Bellevue, WA (US); Michael David Marr, Sammamish, WA (US); Robert Ian Oliver, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1516 days.

(21) Appl. No.: 10/794,292

(22) Filed: Mar. 5, 2004

(65) Prior Publication Data

US 2005/0198507 A1 Sep. 8, 2005

(51) Int. Cl.
*G06F 11/30* (2006.01)
*G06F 12/14* (2006.01)

(52) U.S. Cl. .................. 713/193; 713/170; 713/187; 719/331; 717/127; 717/163

(58) Field of Classification Search .................. 713/193
See application file for complete search history.

(56) References Cited

U.S. PATENT DOCUMENTS

| | | | | |
|---|---|---|---|---|
| 6,253,258 | B1* | 6/2001 | Cohen .................. | 719/331 |
| 6,802,006 | B1* | 10/2004 | Bodrov .................. | 713/187 |
| 7,360,097 | B2* | 4/2008 | Rothstein .................. | 713/189 |
| 2005/0108562 | A1* | 5/2005 | Khazan et al. .................. | 713/200 |

OTHER PUBLICATIONS

Marchesini et al. "Keyjacking: Risks of the Current Client-side Infrastructure", 2nd Annual PKI Research Workshop, Apr. 21, 2003.*
Hunt, G. et al., "Detours: Binary Interception of Win32 Functions", *Proceedings of the 3rd USENIX Windows NT Symposium*, Jul. 1999, Seattle, WA., 1-9.
Leman, D., "Spying on COM Objects", Jul. 1999, 10(7), http://www.windevnet.com/wdm/articles/1999/9907/, 1 page.
Pietrek, M., "Under The Hood", http://microsoft.com/msj/0200/hood0200.aspx, Feb. 2000, 9 pages.

* cited by examiner

*Primary Examiner*—Matthew B Smithers
*Assistant Examiner*—Shewaye Gelagay
(74) *Attorney, Agent, or Firm*—Woodcock Washburn LLP

(57) ABSTRACT

The import address table of a software module is verified in order to prevent detouring attacks. A determination is made regarding which entries in the IAT must be verified; all of the entries may be verified or some subset of the entries that are critical may be verified. For each external function, the external module containing the external function is loaded, if it is not already loaded. The function address in the exported function table is found. That address is compared to the address for the function in the IAT. Additionally, the external module, in one embodiment, is verified to ensure that it has not been modified. For a delay load IAT, a similar procedure is followed; however the delay load IAT may be periodically checked to ensure that the delay load IAT entries are either valid (indicating that the external function has been bound) or in their initial state (indicating that no binding has yet occurred).

17 Claims, 5 Drawing Sheets

IMPORT ADDRESS TABLE VERIFICATION

FIELD OF THE INVENTION

The present invention relates generally to the field of computing, and, more particularly, to the secure execution of a software module.

BACKGROUND OF THE INVENTION

Generally, computer applications run by executing object code. The object code controls the actions of the computer systems on which it is run. Such code may be made public or otherwise made accessible by its authors, for example by publishing the original source code that was compiled to create the object code. The original authors may also choose to make the code more usable by other programmers by including "debug symbols" which are data files which help to describe the structure of the object code so that users of the code can debug their own programs. However, for some uses, it is advisable to protect code from examination by possible adversaries. For example, where the code represents the best available implementation of a particular algorithm, the code itself may represent a trade secret. In another example, where code is used to secure content, it may be useful to protect the code in order to ensure the security of the content from an adversary. In order to protect users of an application from unauthorized tampering with the code, a number of security precautions may be utilized.

Some of these security measures are physical. For example, a user purchasing software on a CD-ROM may be able to verify that the CD-ROM is a legitimate copy of the software by inspecting holograms or other security devices on the packaging.

Module authentication, in which the integrity, and security, of software is protected against tampering, provides a level of protection against malicious changes to the software such as code patching, redirection, and software breakpoints.

One form of module authentication is to ensure that read-only content contained in the software module is unchanged. This may be done via static module authentication. Static module authentication is the process of verifying the persistently stored image of the module, which in some cases can be thought of as the "on-disk" module. For example, one mechanism to check the module on-disk may be accomplished by hashing the file and comparing the resulting hash value with a pre-computed hash value of the file that has been signed by a trusted signatory.

The process of hashing (also known as computing a digest), is a standard cryptographic technique for identifying data with a relatively unique, but substantially smaller representation than the original data. The algorithm can be performed on a binary source of arbitrary length, in this case, a file, and the result of the hashing computation is a smaller, usually fixed-size piece of binary data known as a hash, hash value, or digest. For example, FIPS SHA-1 (Federal Information Processing Standards Secure Hash Algorithm 1) produces a 20-byte long hash regardless of the amount of data that is processed. A good hashing algorithm, like SHA-1, will produce significantly different hash values even for minute changes in the source data, or binary file in this case.

According to cryptographic number theory, there is essentially no way to predict what changes to a file could be made while still producing the same hash value. Therefore, it is infeasible to make a modification to a file to insert malicious changes and maintain the same hash of the modified file. Therefore, the hash of a file can be compared to a stored hash in order to validate that no modifications have been made. In order to prevent an adversary from changing the stored pre-computed hash as well as the module being validated, the validity of the stored hash must be verifiable. For example, the table of stored hashes may be signed by a trusted signatory.

However, many software modules use functionality in other software modules known as dynamic link libraries or DLL's. In order to run, some software modules which reference functions contained in other software modules include an import address table (IAT). The IAT is a table of addresses for functions that are imported by a module. The "on-disk" initial values of the import address table (IAT) are updated by the operating system (OS) loader once the module is loaded into memory and function addresses are resolved against DLL export tables to point to the locations of functions in other modules.

Thus, dynamic linking of external DLL's is implemented through the IAT. This process is referred to at "binding". References to functions implicitly linked in the software module are specified in the module's import data. At load-time, the operating system loader refers to the import table to determine which external functions in which DLL's must be bound. These references to external functions are centralized in the IAT so that binding is efficient. The table of addresses that is the IAT is used to provide a level of indirection between calls to external functions within a module and the external function call sites in other modules. That is, the IAT represents a single point of modification for the loader for all external references from a module. In other words, the OS loader must only update the addresses in the IAT instead of modifying every reference to each imported function spread throughout the software module, which can be several references for each imported function. At load time, the loader will determine where each imported function is located (e.g. a DLL file), load into memory the file, if necessary, containing the function, compute the location of the external function in the file, and place the address for the function in the IAT of the calling module. The file containing the external function contains an export table which is consulted by the loader to determine the proper address for the external function.

Because the IAT changes at load-time to include the actual addresses for functions which will be needed by the software module, and the locations of those functions can only be determined at run-time after the containing modules have been loaded into memory, the in-memory IAT can not be authenticated by trivial comparison with the version of the IAT in the on-disk image. However, because the IAT is not authenticated, then an adversary may "detour" calls to external functions, exposing potentially sensitive data to an attacker. For example, a software module SM may call to function A. The OS loader loads the DLL file containing function A and inserts the proper address for function A into the IAT of SM. An adversary may write a function FAKEA, which calls function A by passing the data from the call from software module SM to function A and returns any returned data from function A to the software module SM. At this point, the adversary has the ability to examine all data both passed from and returned to function A. In addition, the adversary has the ability to manipulate that data in order to possibly change the behavior of the function call, leading to unintended program behavior. This might, for example, be used to subvert security measures and access checks. This is known as "IAT detouring" and when used as a reverse engineering technique is in some cases referred to as a "man-in-the-middle" attack.

Several well-known and publicly available software programs, such as the "Detours" program, provide simplified mechanisms for program instrumentation through IAT modification. In addition, there are other programs that also perform such IAT modification for altruistic purposes. For example, virus checkers and accessibility tools may make use of IAT detouring to insert themselves into the code path of important function calls. Thus, in the case of a virus scan, a call to a function may allow the file containing the function to be virus scanned. In the case of an accessibility tool, data to be displayed on a monitor may be enlarged or otherwise used in order to provide greater accessibility.

Obviously, however, IAT detouring can expose sensitive information and jeopardize the security of sensitive code. In cases, such as in the digital rights management context, it may be important to either prohibit such IAT detouring or limit the functions which can perform it to authorized modules.

In addition to the IAT, a delay load IAT may be present. Such a table performs a function similar to the IAT's function by storing addresses for imported functions. However, binding for the delay load IAT occurs only when an imported function is called for the first time by a module. This late binding can sometimes result in a performance improvement when loading the module because the binding process is bypassed. Thus, the cost of binding an imported function is only incurred if the function is actually called by the application module. The performance benefit is most noticeable in cases where many functions are imported but few are actually used during a particular session of the process. For example, the cost of binding spell checking functions in a word processor program is unnecessary if the spell checker is never used during a particular word processing session. The delay load IAT is subject to the same possible detouring described with reference to the IAT.

In view of the foregoing, there is a need for a system that overcomes the drawbacks of the prior art.

SUMMARY OF THE INVENTION

The present invention allows run-time verification of an import address table (IAT) by ensuring that the IAT contains only legitimate addresses so that calls to external functions do not provide sensitive content to insecure or adversarial functions.

Such verification involves several tasks. In one embodiment, a verifier for an IAT in a software module which provides addresses for functions in external modules must:
  determine which code paths need to be protected; and
  verify that the correct import address appears for imported functions in the IAT for those code paths Once the verification has been completed, the correct function will be called using the IAT. In order to determine whether the imported function in the external module has itself been altered, a module authentication system may be used in conjunction with IAT authentication. This ensures that the external modules called using the IAT addresses are not compromised. The IAT verifier ensures that the IAT is calling the correct external module at the correct address, and the module authentication system ensures that the external module has not been tampered with, particularly at the site of the needed external function.

Each external function call in a software module is a code path which may be vulnerable to a detouring attack. However, some of these code paths may not be of interest. For example, a code path which is never called with sensitive information may potentially be omitted from IAT verification without an adverse effect on security. In one embodiment, the determination of which code paths need to be protected is performed by examining a list of external modules used by the software module that should be authenticated. This may be supplied by the software module author. In cases where all external functions called by the software module must be protected from a detour attack, examination of all the functions imported by the module as specified in the module's import data yields the list of code paths to be protected.

In one embodiment, the correct address of an imported function is determined by duplicating the binding algorithm of the operating system's loader. The verifier authenticates the export data in the external modules to determine that the export table addresses have not been modified. The verifier then authenticates the import data in the software module for the external modules being bound, thus determining the correct address for an imported function.

These verification tasks may be performed once, when a software module is loaded, for the IAT of that module. A secure copy of the IAT is then kept for possible re-verification.

Similarly, the tasks described above must also be performed to verify the delay load IAT. However, when performing delay load IAT authentication, because the address in the delay load IAT for an imported function may not yet have been bound, that address cannot be immediately verified. According to one embodiment, for each entry in the delay load IAT, two states are permitted. A first state corresponds to the state of the delay load IAT for that entry before binding occurs for the corresponding imported function. A second state corresponds to the state of the delay load IAT for that entry after binding has occurred. The delay load IAT is periodically checked to ensure that each entry is either in the first state or the second state. If the delay load entry is in the second state, the entry is verified similarly to an entry in the IAT; if the entry does not verify, then execution will be halted. Entries in the second state can be periodically re-verified as the security model dictates, and according to one embodiment, are not allowed to change once verified or execution will be halted.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Overview

The IAT of a software module, if not verified, can leave the software module open to a detouring attack. In order to ensure that the IAT has not been tampered with, the IAT is verified. A determination is made regarding which entries in the IAT must be verified. The address of an imported function that must be verified is determined from the export table of the external module which contains that imported function. Once the correct addresses are determined for the imported functions to be verified, these addresses are compared to the addresses in the IAT being used by the executing module in memory.

In addition, in one embodiment, the external module is verified by a module authentication system to ensure that its export table and its exported functions are not modified. Although it is possible to perform the IAT verification without verifying the external module, the assurances against code detouring are stronger if the external module is verified. If the external module is not verified, the external module's export table is subject to the same sort of modification as the IAT. There is little benefit to performing a verification against an address that is itself unverified. Similarly, the benefit of the verification is increased if the actual function at the determined address is verified as well. In the case of a delay load IAT, the delay load IAT may be periodically checked to ensure that the delay load IAT entries are either valid (indicating that the external function has been bound) or in their initial state (indicating that no binding has yet occurred).

Exemplary Computing Arrangement

Figure 1:
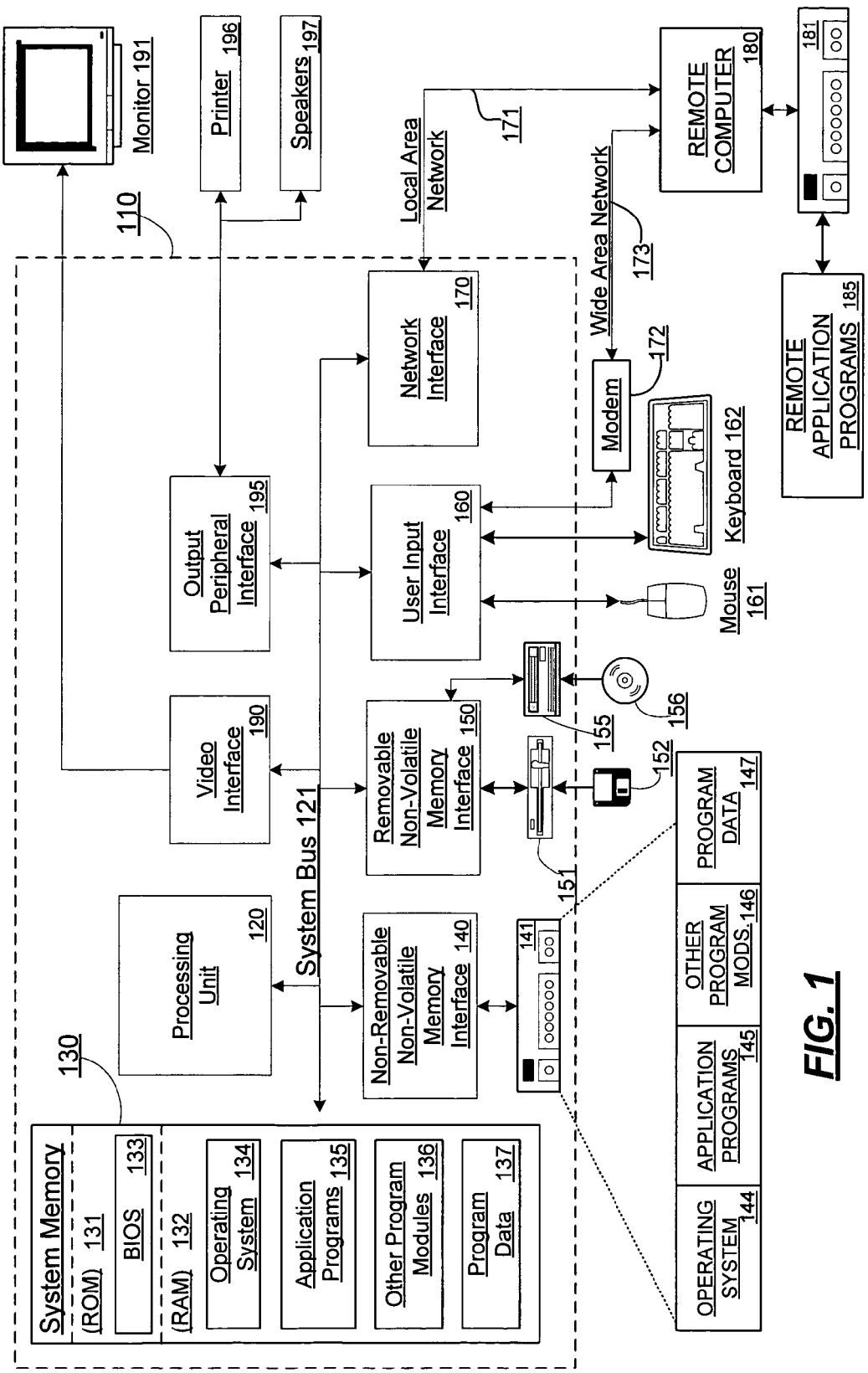
FIG. 1 is a block diagram of an example computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Module Authentication

As discussed above, the invention provides mechanisms for IAT verification that will determine that the IAT (or the delay load IAT) has not been tampered with, and that the addresses for external functions are correct in the IAT. In order to ensure that the code at these addresses has not been modified by an adversary, module authentication is used.

Authenticating a program module verifies that the program module has not been modified relative to a known state. The following description relates to the module authentication procedure.

Module authentication is a security feature that helps protect the application execution environment against tampering. When used properly, it provides some level of protection against code patching, execution redirection and software breakpoints. The level of protection is dependent on the number of modules in the applications process space that are authenticated and the frequency of the authentication.

There are two phases to module authentication. Static authentication is a one-time check of persistently stored (or "on-disk") module images while dynamic authentication is a check of the in-memory module images being used for execution by the processor. Dynamic authentication is an ongoing process since tampering can occur anytime in the life of the application process.

In practice, application performance and the openness of a process on common operating systems limit authentication to a subset of modules. The application specifies this subset of all its loaded modules via the application manifest. All modules that receive sensitive data should generally be authenticated.

The purpose of static module authentication is to establish the authenticity of the on-disk images of important executable modules in the application process space. This includes both application and system modules. Static authentication does little to protect the execution environment directly, but it does serve an important purpose:

It gives some assurance of the identity of the running application beyond just a module name matching.

It provides a basis for determining if the in-memory image of the application is authentic (a basis for dynamic module authentication).

For standard static authentication, the PE (portable executable) file on the persistent storage device (which is usually a disk, but can also be, for example, flash memory on a portable device) is hashed and checked against a signed hash value. To compute the file hash, the PE headers of the file must be parsed in order to avoid hashing data that can legitimately change after the file is created. Examples are timestamps and global data sections. The algorithm for hashing the PE file is the same one used by many versions of the Windows operating system for signing system binaries, but can be used on any operating system.

Dynamic module authentication is the authentication of the in-memory images of modules loaded into memory for execution. While static module authentication only gives an assurance that the executable file on disk hasn't been tampered, dynamic module authentication gives an assurance that code pages in memory haven't been tampered with after being loaded by the operating system. It is a mechanism by which the system can protect the application's execution environment against attacks such as code redirection via import tables or inserted jump instructions and even software breakpoints. An example of a software breakpoint on the IA32 processor platform is the "int 3" machine instruction. Since code pages can be tampered with anytime during the life the process, dynamic module authentication must periodically verify the integrity of the application over the lifetime of the application session. Dynamic module authentication can be expensive and thus must be managed carefully so that it does not adversely affect the performance of the applications it is protecting.

The setup of dynamic authentication involves computing the expected in-memory page-level hashes of all read-only module pages. The page hashes are stored in tables for quick reference in subsequent page verification. The basis for establishing what the code pages should look like in memory is a trusted representation of the module. For instance, a signed version of the on-disk image of the module may serve this purpose. Determining the expected page hash is complicated by the existence of relocations and import address tables. Relocations are hard-coded addresses in a binary module that must be updated to reflect the run-time memory location of that binary module. This process is sometimes referred to as "rebasing" because it changes the assumption (introduced when the binary was compiled) about what base address, or memory location, the binary will be loaded into memory. Like import address tables, rebasing is performed by the OS loader when the module is loaded into memory. Authenticating relocated pages and import tables requires the duplication of the same logic used by the OS loader. For example, if the module being authenticated was rebased by the OS, we must apply relocation fix-ups to the appropriate addresses, in the trusted representation of the module, before computing each page hash in order to get the hashes to match the expected images of the pages loaded in memory.

The verification phase involves computing hashes of actual memory pages for comparison with expected hash values stored during initialization of the dynamic module authentication system. Two types of verification are enabled. First, arbitrarily-sized portions of the authenticated modules can be checked at run-time for verification. This checking can be performed on a random sample of pages to increase the likelihood of detecting tampering in a large application. The second type of validation enabled is that of "hot page" validation. For example, run-time call stack validation assumes that the address of the instructions in the application that call into a secure system can be reliably determined. Dynamic module authentication enables targeted verification of these addresses. That is, the address of the caller can be validated to come from within an "allowed" module. This prevents calls into the secure system directly from untrusted code. In addition, the memory pages surrounding and containing the call instruction to the secure system can be authenticated to protect against tampering. This check prevents an adversary from using a tampered "allowed" caller. A similar technique can be used for any addresses to code or read-only data, including, for example, those found in import and export address tables, C++ v-tables, pointers to string literals, and other global function pointers.

IAT Verification

In order to ensure that the IAT does not permit unauthorized detouring, import address table verification is performed. As discussed above, this verification determines that the addresses for external functions contained in the IAT are legitimate. IAT verification can be used in combination with module authentication to ensure that external functions calls are performed correctly and that the external functions being called have not been modified in an unauthorized way, as by an adversary. Additionally, once the IAT has been verified, a hash of the IAT can be stored by the module authentication software for the purposes of future re-verification, much as any memory page hash is verified.

In order to perform IAT verification, a determination must be made as to which code paths to external functions need to be protected. For example, in a system in which secure content is rendered on a display by an external function, the code path, including external function(s), by which such a display occurs, should be protected. In one embodiment, the author of a software module stores a list of external functions whose entries in the IAT must be protected via IAT validation. In a second embodiment, addresses for all external functions with a corresponding entry in the IAT must be protected through IAT validation. No matter how the determination is made as to which entries in the IAT to verify, an external function for which the corresponding entry in the IAT must be verified may be termed a "critical function."

IAT verification duplicates some steps performed by the operating system loader.

Loading a Software Module

Figure 2:
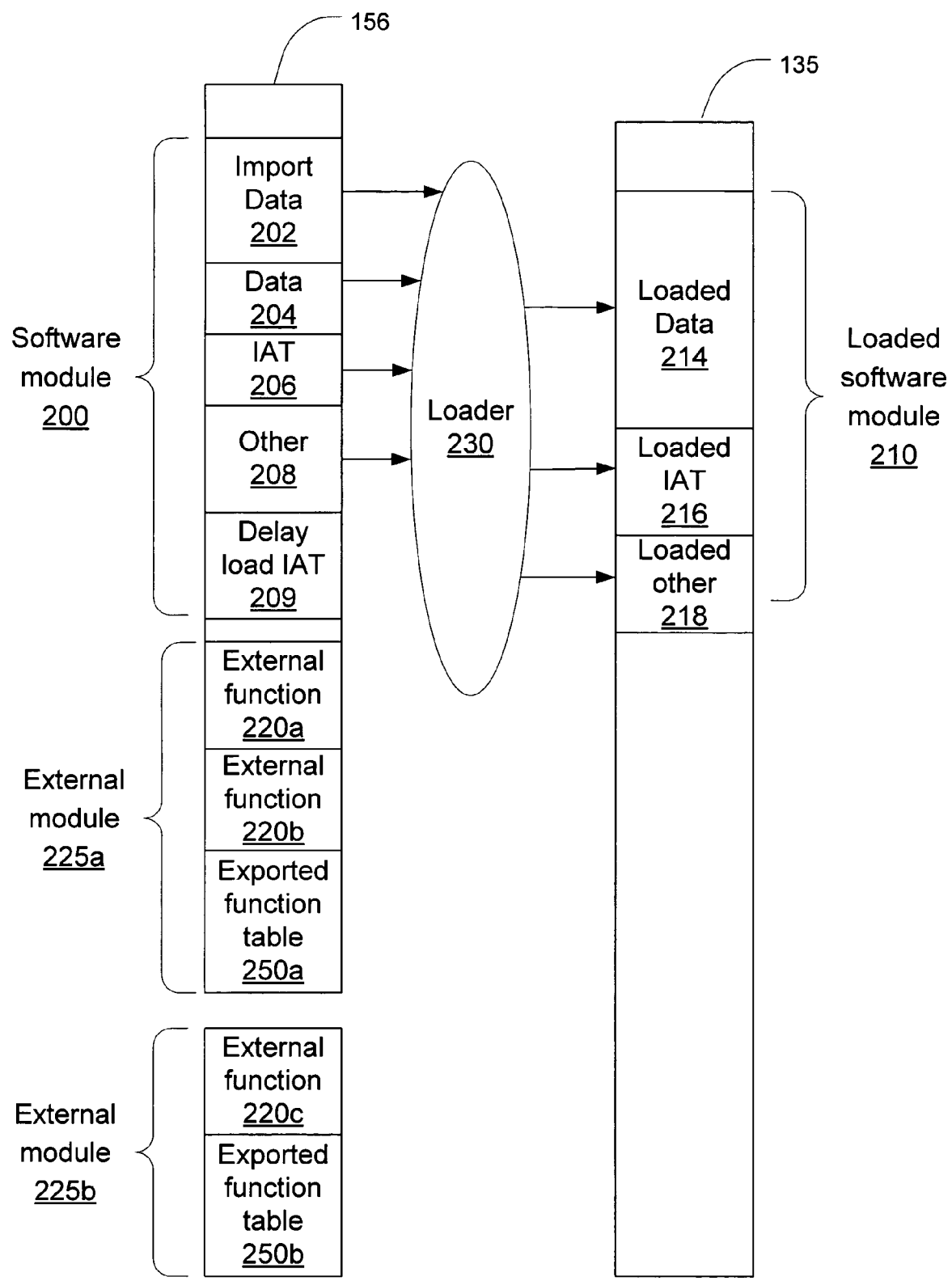
FIG. 2 shows how a software module may be loaded in accordance with aspects of the invention.

FIG. 2 shows how a software module may be loaded from removable/non-removable, volatile/nonvolatile computer storage media into RAM in system memory for application programs 132. By way of example only, FIG. 2 illustrates the storage media as a nonvolatile optical disk 156, such as a CD ROM, as shown in FIG. 1 and described above.

Generally, software module 200 contains several different constituent parts. As an example, as shown in FIG. 2, the software module 200 contains data 204, an import address table (IAT) 206, and other software module information 208. Data 204 includes program data, such as code to be executed and data which is used by the code. In some software modules, a code section may be included which is separate from other sections containing other read-only data. IAT 206 contains the structure for a table which holds the locations of external functions 220 (such as 220a, 220b, and 220c in FIG. 2) in other modules such as external modules 225 (225a and 225b), which external functions 220 are called by the software module 200 in its operation.

In order to load the software module 200, loader 230 loads software module 200 into application program RAM 132. All of software module 200 may be loaded into application program RAM 132, or, alternately, only a working set needed to begin execution of the software module may be loaded. The resulting loaded software module 210 contains either all of or a working set of loaded data 214, loaded IAT 216, and loaded other software module information 218. These are analogues to the data 210, IAT 206 and other software module information 208 stored on disk.

Figure 3:
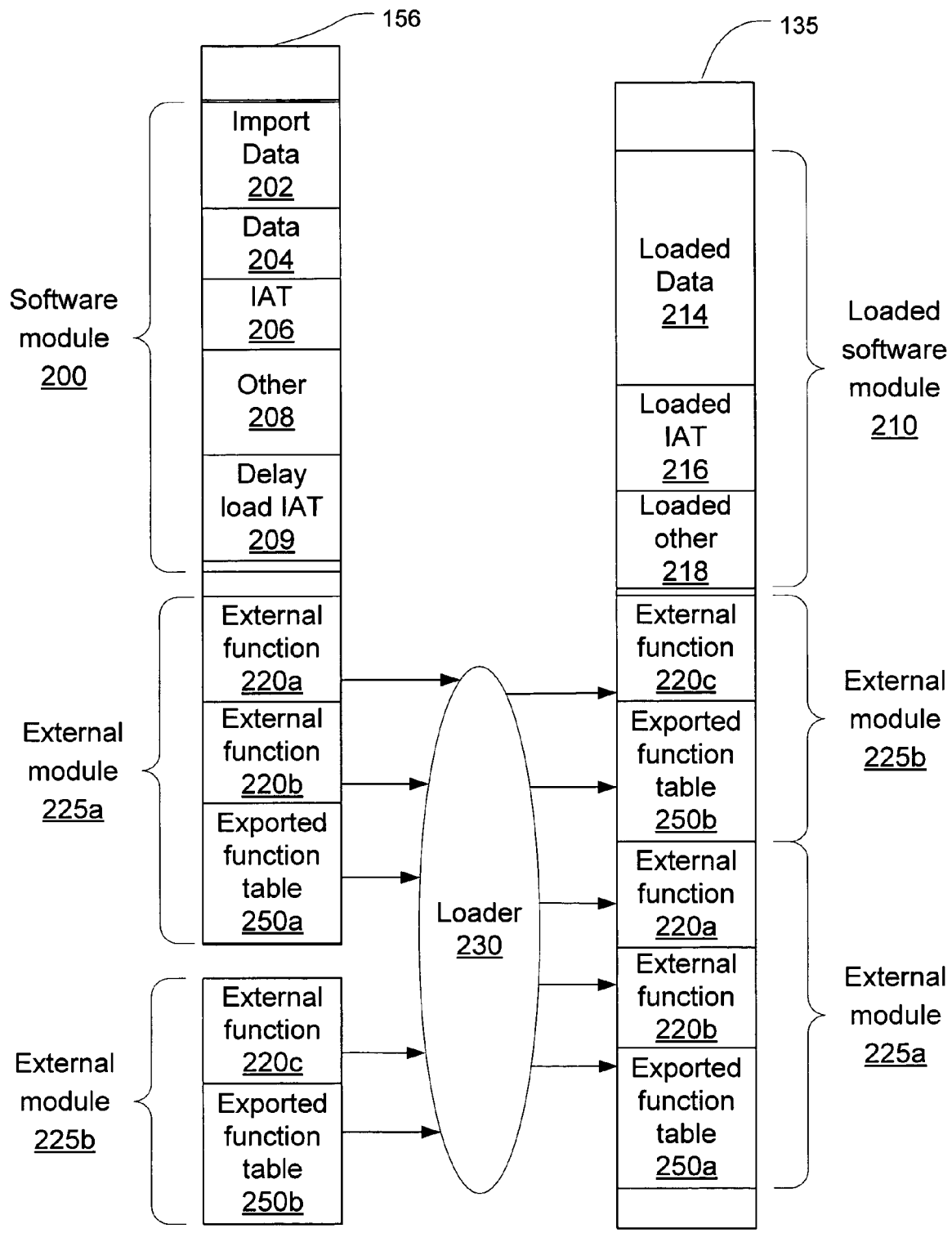
FIG. 3 shows how external functions are bound and their addresses entered into the IAT in accordance with aspects of the invention.

To construct the loaded IAT 216, the loader 230 reviews the import data 202. The import data 202 specifies which external modules 225 contain external functions 220 whose addresses the IAT 216 must contain. FIG. 3 shows how external functions are bound and their addresses entered into the IAT 216. In the example illustrated in FIG. 3, both external module 225a and external module 225b are loaded. While certain changes may occur to the external modules 225 as a result of loading, such changes are less significant to the invention being discussed, and therefore these changes are not noted in FIG. 3. External module 225a is loaded because one or both functions contained in it are described in the IAT of software module 200; the IAT may contain an entry for either external function 220a, external function 220b, or both. The loader 230 consults the exported function tables 250 of each external module 225 and determines the correct addresses, as loaded, for the external functions referred to in the IAT 216. The IAT 216, after loading is completed, will therefore contain the correct location of the functions in the other modules 225.

Process of IAT Verification

Figure 4:
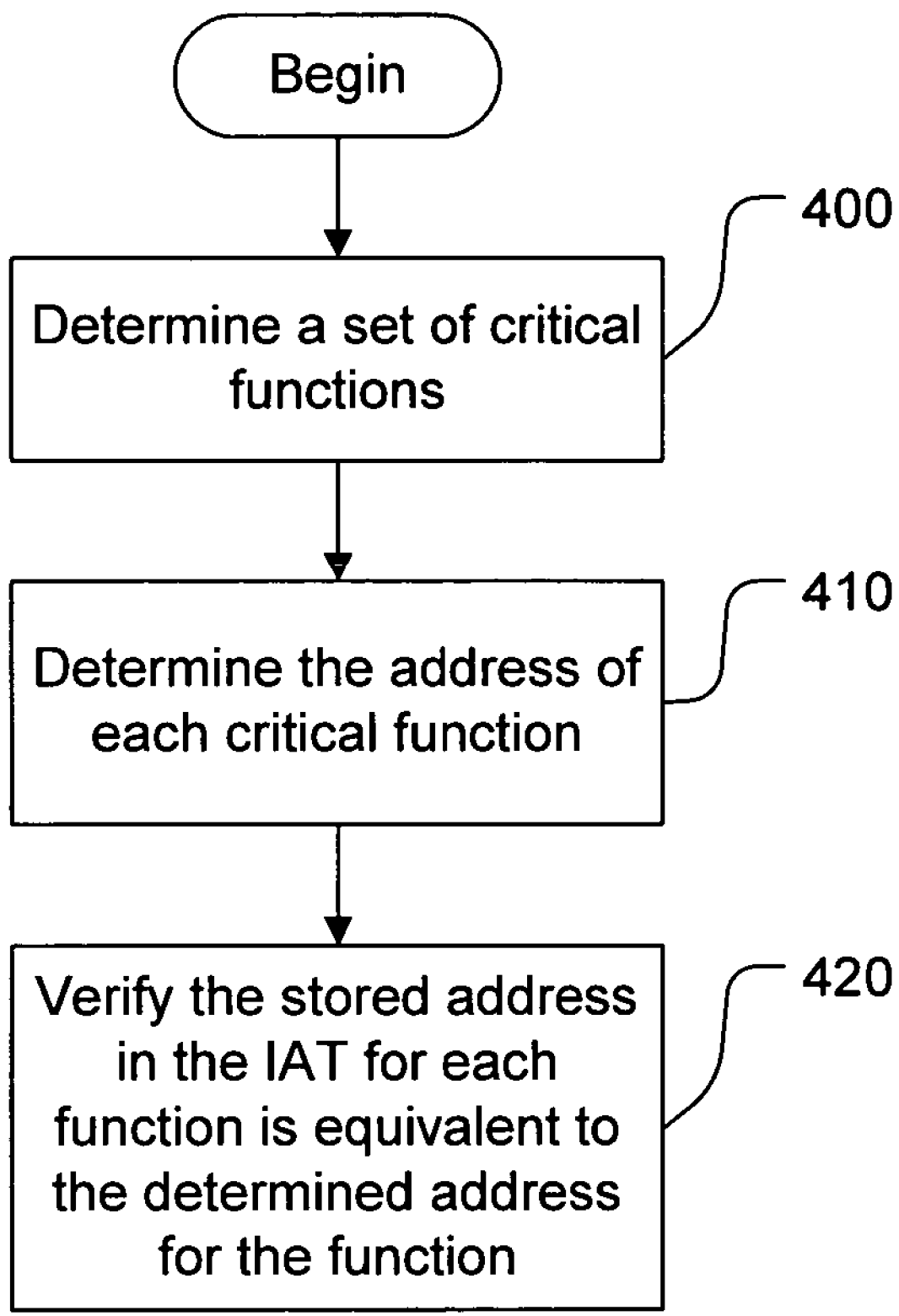
FIG. 4 is a flow diagram describing the process of IAT verification.

FIG. 4 is a flow diagram describing the process of IAT verification. As described above, first, as shown in step 400, a set of critical functions is determined. The IAT verification process then determines the address of each critical function, in step 410. This determination is done in a way similar to the way the IAT is originally populated—the proper external module 225 and function is located by consulting the information contained in the module's import data 202, and the exported function table 250 of the external module 225 is consulted to find an address. An important, but optional, part of step 410 is the verification of the external module export table and verification of the function indicated in the export table. This is done to ensure that the determined address for the critical function expected to be in IAT is reliable and that function pointed to by this address has not been modified.

When the IAT verification process has determined an address in step 410, in step 420, it is verified that the stored address in the IAT is equivalent to the determined address for each critical function.

In one embodiment, a verified IAT is created to compare the loaded IAT 216 to. In creating such a verified IAT, the address determined at step 410 is used for each critical function. IAT entries for functions which are not critical functions may be copied from the loaded IAT 216. In this way, a verified IAT is created which may be compared to the loaded IAT 216 for reverification. In one embodiment, this verified IAT is hashed and the hash is stored instead of the separate verified IAT. To perform a reverification, the loaded IAT 216 may be hashed, and the resulting hash compared to the stored hash.

Figure 5:
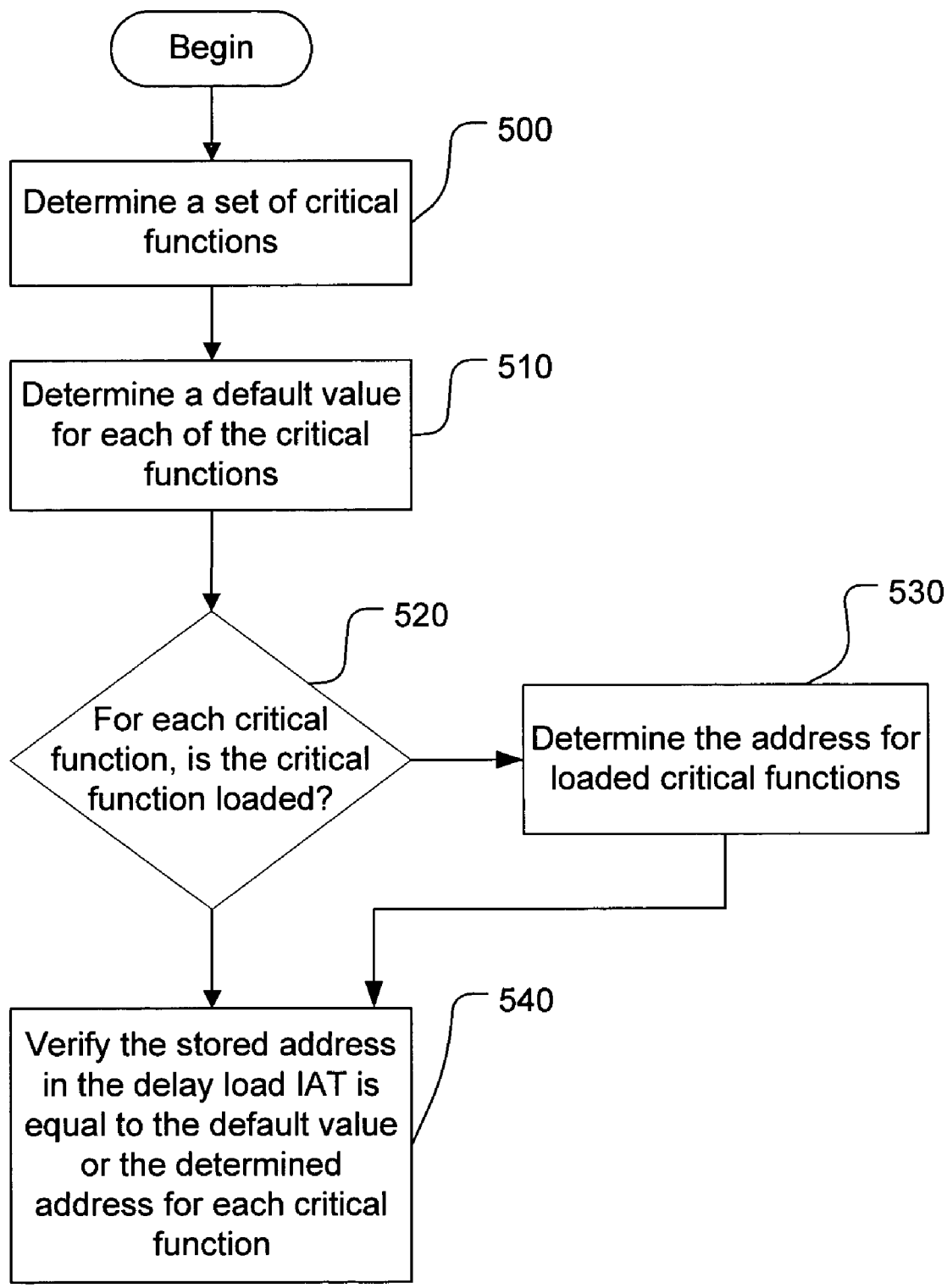
FIG. 5 is a flow diagram describing the process of delay load IAT verification

As described, a delay load IAT may also exist for the software module. This allows modules to be loaded and functions to be bound only when required. IAT verification as described above may be used for verifying the delay load IAT; however, this will require all functions to be initially loaded, thus negating the benefits of the delay load IAT. Thus, a delay load IAT verification must be accomplished using a slightly different process. FIG. 5 is a flow diagram describing the process of delay load IAT verification. As shown in FIG. 5, similar to the non-delay load IAT verification, in step 500, a set of critical functions is determined. A default value for each critical function in the delay load IAT is determined in step 510. Step 510 is performed by examining the delay load import data (209 in FIGS. 2 and 3) contained in the module and then consulting the exported function table 250 of the external module 225. This default value will be a value derived from the delay load IAT of the static image of the importing module. This value happens to be the address of the code stub used by the process to bind the imported function once it is first called. In other words, the default value is what is in the static image of the binary before the external function address has been bound. The version on the static copy may undergo some loading changes (e.g. by applying relocations), and such loading changes, in this embodiment, must also be performed to obtain the default value. Alternatively, there may be an expected default value.

If the default value for a critical function in the delay load IAT is not the value stored in the delay load IAT (decision 520), an address is determined for the critical function, step 530. In the last step 540, for each critical function, it is verified that the delay load IAT address for the critical function is equivalent to either the default value for the critical function or the determined address for the critical function. If this is true, then verification is successful. According to one embodiment of the invention, because the delay load IAT changes dynamically, this delay load IAT verification is repeated periodically to ensure that each entry is either in the first state or the second state. According to one embodiment of the invention, if a determined address for a critical function had been found and verified in a previous verification, in the reverification the determined address may be checked to determine if it has changed. If it has changed, then verification fails.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for run-time verification of an import address table for a software module, said method comprising acts of:
    loading a software module into system memory, the software module including an import address table that is configured in-memory with import address table entries comprising stored addresses of one or more external functions in external modules that are used by the software module during run-time; and
    performing run-time verification of the in-memory import address table of the software module loaded in system memory, wherein run-time verification comprises:
        determining a correct address for each external function that is deemed a critical function for which a corresponding entry of the external function in the in-memory import address table must be run-time verified; and
        verifying that the stored address in the in-memory import address table for the external function is valid if said stored address is equivalent to the determined correct address for the external function;
        constructing a verified import address table version of the in-memory import address table at a time when said in-memory import address table is validated; and
        re-verifying the in-memory import address table by comparing said verified import address table to said in-memory import address table, wherein said act of re-verifying occurs periodically while said software module is executing.

2. The method of claim 1, further comprising determining which of said external functions are deemed critical functions by reading a stored list specifying at least some of said external functions that are deemed to be critical functions.

3. The method of claim 1, wherein all external functions for which said import address table contains a stored address are deemed critical functions.

4. The method of claim 1, wherein loading a software module into system memory is performed by an operating system loader, wherein said import address table is configured in system memory by a set of loader actions performed by said loader and wherein said act of determining a correct address during run time verification is performed using operations substantially similar to said loader actions.

5. The method of claim 4, where said operations comprise:
looking up an address for the external function in an exported function table in said external module.

6. The method of claim 1, wherein performing run-time verification of the in-memory import address table further comprises, for each external function that is deemed to be a critical function, verifying that said corresponding external module has not been modified.

7. The method of claim 6, further comprising:
periodically re-verifying that portions of said external modules containing code related to said critical functions have not been modified.

8. The method of claim 1, wherein said verified import address table is constructed with entries for external functions that are deemed critical functions populated with the correct addresses as determined during run-time verification, and with entries for external functions that are not deemed critical functions populated with copies of respective entries in said in-memory import address table.

9. The method of claim 1, further comprising acts of:
hashing said verified import address table yielding a first hash;
hashing said in-memory import address table yielding a second hash;
re-verifying the in-memory import address table by comparing said first hash and said second hash.

10. A computing device comprising a processor system and a memory system to store program instructions that are executable by the processor system to perform acts as recited in claim 1.

11. A computer readable storage medium comprising computer executable instructions that are executable by a computer to perform run-time verification of an import address table for a software module, the computer executable instructions comprising:
computer executable instructions for loading a software module into system memory for run-time execution, the software module including an import address table that is configured in-memory with import address table entries comprising stored addresses for one or more external functions in external modules used by the software module during run-time;
computer executable instructions for determining a set of critical functions comprising one or more of said external functions deemed to be a critical function for which a stored address in the in-memory import address table must be run-time verified;
computer executable instructions to perform run-time verification of the in-memory import address table of the software module loaded in system memory, wherein said computer executable instructions to perform run-time verification comprise:
computer executable instructions for determining a correct address for each critical function having a stored address in the in-memory import address table that must be run-time verified;
computer executable instructions for verifying that for said each critical function, said stored address in the in-memory import address table and said determined correct address are equivalent;
computer executable instructions for constructing a verified import address table comprising entries for each of said critical functions populated with said determined correct addresses, and
computer executable instructions for re-verifying the in memory import address table by comparing said verified import address table to said in memory import address table, wherein comparing said verified import address table to said stored import address table occurs periodically while said software module is executing.

12. The computer readable storage medium of claim 11, wherein said set of critical functions are determined by reading a stored list specifying at least some of said external functions that are deemed to be critical functions.

13. The computer readable storage medium of claim 11, wherein said set of critical functions comprises all external functions for which said in-memory import address table contains a stored address.

14. The computer readable storage medium of claim 11, wherein a correct address for a critical function is determined by looking up an address for that critical function in an exported function table in said external module.

15. The computer readable storage medium of claim 11, further comprising computer executable instructions for verifying that for each of said critical functions, said corresponding external module has not been modified.

16. The computer readable storage medium of claim 11, wherein said verified import address table further comprises, for each external function that is not deemed to be a critical function, an entry that is populated with said address from said in-memory import address table.

17. The computer readable storage medium of claim 16, further comprising:
computer executable instructions for hashing said verified import address table yielding a first hash,
computer executable instructions for hashing said in-memory import address table yielding a second hash; and
computer executable instructions for comparing said first hash and said second hash.

* * * * *